US008990145B2

(12) United States Patent
Lingenfelder et al.

(10) Patent No.: US 8,990,145 B2
(45) Date of Patent: Mar. 24, 2015

(54) PROBABILISTIC DATA MINING MODEL COMPARISON

(75) Inventors: Christoph Lingenfelder, Herrenberg (DE); Pascal Pompey, Nanterre (FR); Michael Wurst, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 691 days.

(21) Appl. No.: 13/214,105

(22) Filed: Aug. 19, 2011

(65) Prior Publication Data
US 2012/0084251 A1 Apr. 5, 2012

(30) Foreign Application Priority Data
Oct. 5, 2010 (EP) .................................. 10186540

(51) Int. Cl.
*G06F 17/30* (2006.01)
*G06F 17/18* (2006.01)
*G06K 9/62* (2006.01)

(52) U.S. Cl.
CPC . *G06F 17/18* (2013.01); *G06K 9/62* (2013.01)
USPC .......................................... 707/600; 707/609

(58) Field of Classification Search
USPC .................................................. 707/600, 609
See application file for complete search history.

(56) References Cited

U.S. PATENT DOCUMENTS

| | | | |
|---|---|---|---|
| 6,636,860 B2 * | 10/2003 | Vishnubhotla ................ 707/600 |
| 6,920,458 B1 * | 7/2005 | Chu et al. ..................... 707/600 |
| 7,636,698 B2 | 12/2009 | Crivat et al. | |
| 7,734,645 B2 * | 6/2010 | Russell et al. ................ 707/776 |
| 7,734,652 B2 * | 6/2010 | Tamayo et al. ............... 707/792 |
| 7,739,297 B2 * | 6/2010 | Russell et al. ................ 707/776 |
| 7,743,068 B2 * | 6/2010 | Russell et al. ................ 707/776 |
| 7,937,350 B2 * | 5/2011 | Lingenfelder et al. .......... 706/45 |
| 2005/0108254 A1 * | 5/2005 | Zhang .......................... 707/100 |
| 2007/0219990 A1 * | 9/2007 | Crivat et al. ...................... 707/6 |
| 2009/0144276 A1 * | 6/2009 | Russell et al. ..................... 707/5 |

OTHER PUBLICATIONS

International Preliminary Report on Patentability, dated Apr. 18, 2013, for International Application No. PCT/EP2011/062076, filed Jul. 14, 2011, pp. 1-10.
Bartolini, I., P. Ciaccia, I. Ntoutsi, M. Patela, and Y. Theodoridis, "The Panda Framework for Comparing Patterns", Data & Knowledge Engineering, 68, 2009, 17 pp.

(Continued)

*Primary Examiner* — Kim Nguyen
(74) *Attorney, Agent, or Firm* — Janaki K. Davda; Konrad, Raynes, Davda and Victor LLP

(57) ABSTRACT

A first data mining model and a second data mining model are compared. A first data mining model M1 represents results of a first data mining task on a first data set D1 and provides a set of first prediction values. A second data mining model M2 represents results of a second data mining task on a second data set D2 and provides a set of second prediction values. A relation R is determined between said sets of prediction values. For at least a first record of an input data set, a first and second probability distribution is created based on the first and second data mining models applied to the first record. A distance measure d is calculated for said first record using the first and second probability distributions and the relation. At least one region of interest is determined based on said distance measure d.

17 Claims, 5 Drawing Sheets

(56) References Cited

OTHER PUBLICATIONS

Doan, A., J. Madhavan, P. Domingos, and A. Halevy, "Ontology Matching: A Machine Learning Approach", Handbook on Ontologies in Information Systems, 2003, 20 pp.

Ganti, V., J. Gehrke, R. Ramakrishnan, W. Loh, "A Framework for Measuring Changes in Data Characteristics", Proceedings of the Eighteenth ACM SIGMOD-SIGACT-SIGART Symposium on Principles of Database Systems, 1999, 12 pp.

Spiliopoulou, M., I. Ntoutsi, and Y. Theodoridis, "Tracing Cluster Transitions for Different Cluster Types", Technical Report, TR-2007-03, Information Systems Laboratory, Department of Informatics, University of Piraeus, Greece, 2007, 14 pp.

Demsar, J., "Statistical Comparisons of Classifiers over Multiple Data Sets", Journal of Machine Learning Research, vol. 7, 2006, pp. 1-30. [Also, Total 30 pp.].

International Search Report & Written Opinion, Jul. 6, 2012, for PCT/EP2011/062076, Total 13 pp.

Pompey, P., "Aufbau Einer Methode Zum Semantischen Vergleich von Heterogenen Data Mining Modellen", [online], [Retrieved on Jun. 29, 2012]. Retrieved from the Internet: <URL: http://www.aifb.kit.edu/web/Thema3208/en>, Record of Diploma thesis submitted at the Formal Description Methods (AIFB), Karlsruhe, Germany, 2010, Total 2 pp.

Salzberg, S.L., "On Comparing Classifiers: Pitfalls to Avoid and a Recommended Approach", Data Mining and Knowledge Discovery, vol. 1, 1997, pp. 317-328. [Also, Total 12 pp.].

\* cited by examiner

PROBABILISTIC DATA MINING MODEL COMPARISON

CROSS-REFERENCE TO RELATED FOREIGN APPLICATION

This application is a non-provisional application that claims priority benefits under Title 35, Unites States Code, Section 119(a)-(d) or Section 365(b) of European (EP) Patent Application No. 10186540.0, filed on Oct. 5, 2010, by Christoph Lingenfelder, Pascal Pompey, and Michael Wurst, which application is incorporated herein by reference in its entirety.

FIELD OF THE INVENTION

The invention relates generally to a method for running a data mining comparison engine as well as to a data mining comparison engine.

The invention relates further to a computer system, a data processing program, and a computer program product.

BACKGROUND OF THE INVENTION

Data Mining is an analytic process designed to explore data, usually large amounts of data in search of consistent patterns and/or systematic relationships between variables, and then to validate the findings by applying the detected patterns to new sets of data. Predictive data mining is the most common type of data mining and one that has the most direct applications. The process of data mining consists of three stages: (1) the initial exploration, (2) model building or pattern identification with validation/verification, and (3) deployment, i.e., the application of the model to new data in order to generate predictions.

The initial exploration stage usually starts with data preparation which may involve cleaning data, data transformations, selecting subsets of records and—in case of data sets with large numbers of variables ("fields or dimensions")—performing some preliminary feature selection operations to bring the number of variables to a manageable range (depending on the statistical methods which are being considered). Then, depending on the nature of the analytic problem, this first stage of the process of data mining may involve an activity anywhere between a simple choice of straightforward predictors for a regression model, to elaborate exploratory analyses using a wide variety of graphical and statistical methods in order to identify the most relevant variables and determine the complexity and/or the general nature of models that can be taken into account in the next stage.

The second stage—model building or pattern identification with validation/verification—involves considering various models and choosing the best one based on their predictive performance, i.e., explaining the variability in question and producing stable results across samples. This may sound like a simple operation, but in fact, it sometimes involves a very elaborate process. There are a variety of techniques developed to achieve that goal—many of which are based on so-called "competitive evaluation of models", that is, applying different models to the same data set and then comparing their performance to choose the best model. These techniques—which are often considered the core of predictive data mining—include: bagging (voting, averaging), boosting, stacking (stacked generalizations), and meta-learning.

The third stage—deployment—involves using the model selected as best in the previous stage and applying it to new data in order to generate predictions or estimates of the expected outcome.

Well known data mining categories include cluster analysis, regression, both linear and non-linear, classification, rule analysis, and time series analysis.

Clustering may be defined as the task of discovering groups and structures in the data whose members are in some way or another "similar", without using known structures in the data.

Classification may be defined as the task of generalizing a known structure to be applied to new data. For example, an email program may attempt to classify incoming email as legitimate or spam. Common algorithms include decision tree learning, nearest neighbour, Naive Bayesian classification and neural networks.

Regression analysis attempts to find a function which models the data with the least error.

Association rule learning searches for relationships between variables. For example, a supermarket might gather data on customer purchasing habits. Using association rule learning, the supermarket can determine which products are frequently bought together and use this information for marketing purposes. This is sometimes referred to as market basket analysis.

The concept of data mining is becoming increasingly popular as an information management tool where it is expected to reveal knowledge structures that may guide decisions in conditions of limited certainty. Using manual techniques, this would not be possible because of the large number of data points involved.

However, in order to use data mining techniques effectively, a comparison of data mining models may be required in order to get optimal result out of existing data.

There are different scenarios in which a comparison of data mining models may be useful. Many application scenarios do not have single data mining models, but multiple, related ones. Some typical examples are data mining models derived at different points in time or in different subsets of the data, e.g., production quality data from different production sites. Another common case is representing the same data with data mining models on different types of data mining models in order to capture different aspects of the data. In all these cases, not only the individual data mining models are of interest, but also similarities and differences between them. Such differences may tell, for instance, how production quality and dependencies develop over time, how data mining models of different types differ in their ways of representing different products produced at the same facility or, how the production facilities differ between each other.

Comparing data mining models manually may be very costly, error-prone and not feasible depending on the amount of available data. While being extremely important, automatic comparison of data mining models has not yet been widely adopted in practice, essentially for two reasons: (a) They allow only comparing models of the same, pre-defined pattern type and thus, have a lack of generality making it impossible to use the methods of most other pattern types. —(b) They are based on the structure of the data mining models and thus, they are severely limited in their expressiveness, which leads to complex results that are often very hard to interpret.

Document U.S. Pat. No. 7,636,698 discloses a method of generating a data pattern—or data mining model—from a dataset based on a comparison of two classification data mining models. Disclosed is an architecture for analyzing pattern shifts in data patterns of data mining models and outputting the results. This allows comparing and describing differences between two semantically similar classification patterns—or classification mining models—and analyzing historical changes in versions of the same classification model or differences in pattern found by two or more classification algorithms applied to the same data.

Thus, there may be a need for an improved method and an engine for comparing data mining models, in particular for the case in which the data mining models do not belong to the same category of data mining models.

SUMMARY OF THE INVENTION

This need may be addressed by a method for running a data mining comparison engine, a data mining comparison engine, a computer system, a data processing program, and a computer program product according to the independent claims.

The invention provides a method for running a data mining model comparison engine for comparing a first data mining model with a second data mining model. The method comprises the following steps:

providing a first data mining model representing results of a first data mining task on a first data set, said first data mining model providing a set of first prediction values;

providing a second data mining model representing results of a second data mining task on a second data set, said second data mining model providing a set of second prediction values;

providing a relation between said set of first prediction values and said set of second prediction values;

determining an input data set;

carrying out the following steps on at least a first record of the determined input data set:

creating a first probability distribution based on the first data mining model applied to the first record, said first probability distribution associating probabilities with said set of first prediction values;

creating a second probability distribution based on the second data mining model applied to the first record, said second probability distribution associating probabilities with said set of second prediction values;

calculating a distance measure for said first record using the first and second probability distributions and the relation;

determining at least one region of interest based on the distance measure calculated for records of the determined input data set.

A data mining comparison engine comprising a providing unit adapted for providing a first data mining model M1 providing a set of first predictions values and a second data mining model M2 providing a set of second prediction values, said first data mining model M1 representing results of a first data mining task on a first data set D1 and said second data mining model M2 representing results of a second data mining task on a second data set D2, where the providing unit is also adapted for providing a relation R between said set of first prediction values and said set of second prediction values;

an input data set unit adapted for determining an input data set X;

a calculation unit adapted for calculating for each record of said input data set:

a first probability distribution based on the first data mining model applied to said input data set, said first probability distribution associating probabilities with said set of first prediction values;

a second probability distribution based on the second data mining model applied to said input data set, said second probability distribution associating probabilities with said set of second prediction values;

calculating a distance measure d for said records using the first and second probability distributions and the relation.

a region finding unit adapted for determining at least one region of interest based on the distance measure d calculated for records of the input data set.

BRIEF DESCRIPTION OF THE DRAWINGS

Embodiments of the invention will now be described, by way of example only, and with reference to the following drawings.

DETAILED DESCRIPTION

Figure 1:
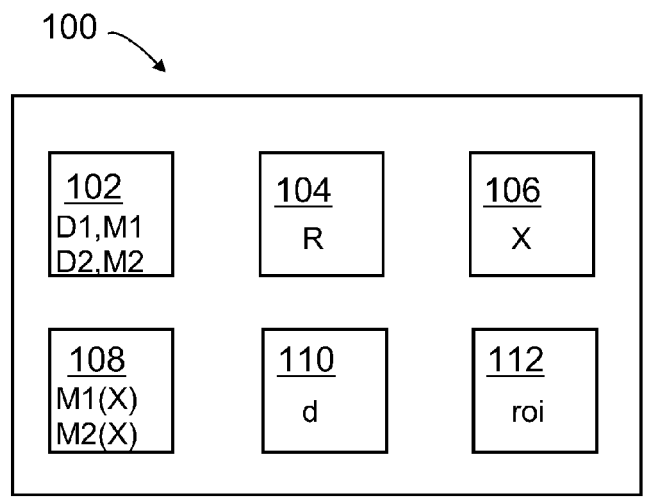
FIG. 1 shows a block diagram of the inventive method for running data mining comparison engine.

As the general concept of the method is described in the summary section, some more specifics are detailed here. The comparison of at least two data mining models M1, M2 is based on comparing the probabilities of the prediction outcomes provided by the data mining models. One advantage of the proposed comparison using the probabilities of the prediction outcomes is that it encompasses the uncertainty of the models' predictions unlike any prior art comparison of data mining models.

As the original data sets D1, D2 based on which the data mining models M1, M2 are generated may contain different records, the comparison of M1 and M2 is done on an input data set X that is typically generated for this purpose. Even if D1 equals D2, their data records may no longer be available when the models are compared.

A first data set D1 and a second data set D2 may be groups of measured data points. Each data point may be understood as a vector with a plurality of dimensions, all having data values of possibly different types. In measurements relating weather, for example, one data point may comprise values for the following quantities: temperature, pressure, humidity, wind direction, wind strength as well as date and time and a geographic position. A group of such data point vectors may be a starting position for developing a data mining model, for example, a weather model for forecasting the weather conditions of the next day, starting from the group of data point vectors as explained.

Data points (records) in the first and second data sets D1, D2 may contain values of same quantities; e.g. they may represent a full set of measurement results in two different time instances or in two different locations. The data sets D1, D2 may even be a single same data set. However, it is possible that the data points in the first data set D1 and the second data set D2 contain different numbers of quantities or different quantities. For example, the first data set D1 may contain humidity values as part of its records whereas the second data set D2 lacks humidity values. The first data mining model M1 is the outcome of a first data mining task on the first data set D1, and the second data mining model M2 relates similarly to the second data set D2. To compare the data mining models M1 and M2, a common input data set X may be needed. This input data set X may be generated based on the original data sets D1, D2 and/or the data mining models M1, M2. One option may be to select records from D1 and/or D2. Records of this input data set need to contain values for at least those quantities that both the first data mining model and the second data mining model require as input. The input data set X may be identical to one or both (if D1, D2 are the same data set) of the original data sets D1, D2.

The data mining models M1 and M2 may provide different predictions. This is the case, if the first and second data mining tasks T1, T2 are different (e.g. clustering task, classification task, regression task), but may also occur for identical tasks, for example if M1 contains clusters A1, B1, and C1, while M2 contains A2 and B2.

M1 provides a set of first prediction values (e.g. a number of clusters) and M2 provides a set of second prediction values (e.g. a different number of clusters; a prediction based on regression; a set of labels/classes). To be able to compare M1 and M2, there needs to be provided a relation R between the set of first prediction values and the set of second prediction values. This relation R may be the identity relation, if the set of first prediction values is identical to the set of second prediction values. Some further examples of such relations are given below in the detailed examples. Based on those examples, it is clear to a skilled person how to create such relations. Even if the mining tasks T1, T2 are the same mining task, the resulting data mining models M1, M2 may be different as the data sets D1, D2 may be different, or because the algorithms or their parameterizations may be different. The approach explained in this patent application can thus also be used to compare data mining models M1, M2 relating to mining tasks T1, T2 that are the same mining task.

Furthermore, the comparison of the data mining models M1 and M2 uses probabilities that M1 and M2 assign to the prediction values relating to the input data set records. The comparison of probabilities enables comparison of data mining models that are structurally different or relate to different mining tasks (e.g. two regression models using different highest orders of polynomials; a clustering model and a regression model).

We refer again to the original data sets D1, D2. Each numeric dimension of the data point vectors has two extreme values, i.e., a highest value and a lowest value. All extreme values define a domain of interest. Consequently, all data point vectors of the dataset are within the domain of interest. Mathematically, the domain of interest defines the space of all data point vectors or simply the space of the dataset. It is known to those skilled in the field how to extend this definition to categorical dimensions.

A data mining model, once being defined, may also generate a complete new dataset following the rules of the original data set. This may be useful, if the original data point vectors are no longer available. In such a case, a new dataset may be generated using the specific data mining model. Here, however, it is also possible that some of the data point vectors may be outside the boundary, e.g., have a data value in one or more dimensions with a value that is slightly outside the corresponding extreme values. Also those data point vectors may be qualified to be used for comparing the data mining models. The input data set X may thus contain (some or all) records from the original data sets D1, D2, and/or it may contain records generated based on the data mining models M1, M2. In some cases, the input data set X may be equal to either D1 or D2 (or all three sets may be equal).

Each data point vector $\vec{x}_i$ in the input data set X may be represented by $$\vec{x}_i = \begin{pmatrix} v_1 \\ v_2 \\ \ldots \\ v_k \end{pmatrix} \quad (1)$$

The values $v_1, v_2, \ldots, v_k$ may represent the values discussed above in the weather model, i.e., $v_1$ may represent a value for a temperature, $v_2$ may be a value for a pressure, etc. In other applications, other values may be used.

The input dataset X may be represented by a k by n matrix comprising n data point vectors, wherein each data point has k dimensions, meaning that k different scalar measurement values have been taken for each data point:

$$\begin{pmatrix} \vec{x}_1 \\ \vec{x}_2 \\ \ldots \\ \vec{x}_n \end{pmatrix} \quad (2)$$

A universal model may be understood as a matrix with the dimensions n by k+2, wherein M1 and M2 are the two data mining models to be compared and each data mining model M1, M2 provides a prediction for one quantity:

$$\begin{pmatrix} \vec{x}_1 & M_1(\vec{x}_1) & M_2(\vec{x}_1) \\ \vec{x}_2 & M_1(\vec{x}_2) & M_2(\vec{x}_2) \\ \ldots \\ \vec{x}_n & M_1(\vec{x}_n) & M_2(\vec{x}_n) \end{pmatrix} \quad (3)$$

Each value $M_a$ ($v_{i,1}, v_{i,2}, \ldots, v_{i,k}$) may be a probability distribution $P_a$, wherein "a" equals 1 or 2 and wherein "i" represents the i-th data point vector. For clustering and classification this distribution is a discrete probability distribution, for regression it may also be a continuous probability distribution.

In more complex situations, these probability distributions are not based on identical sets of possible values or identical numeric ranges for both models. In this case, the universal model also contains a relation R, to match these distributions. This can, for example, be represented by a joint distribution of the Cartesian product of the individual possible values.

It may be assumed that in the simple weather model the matrix value at the column k+1 in the first row, $M_1(\vec{x}_1)$, represents a probability distribution of weather conditions for tomorrow. Possible weather conditions may include "sunny," "clouded" or "rainy." For example, the probability distribution may be represented as {60% sunny, 30% clouded, 10% rainy}.

According to another data mining model $M_2$ the predicted distribution $M_2(\vec{x}_1)$ may be {80% sunny, 10% clouded, 10% rainy}.

In the simplest way, a distance measure may be the sum of absolute differences between the pairs of probability values, i.e., |0.6−0.8|+|0.3−0.1|+|0.1−0.1|=0.4. Alternative difference measures include the Kullback-Leibler divergence.

One embodiment, when dealing with different possible values in both distributions, is to transform $M_1(\vec{x}_1)$ to the values of $M_2(\vec{x}_1)$ or vice versa. This may be achieved by calculating the conditional probabilities from the joint distribution and multiplying them with the distributions calculated by the two original models.

As an example, assume that $M_1(\vec{x}_1)=\{60\%$ sunny, 30% clouded, 10% rainy} and $M_2(\vec{x}_1)=\{30\%$ Sun, 20% Partly cloudy, 30% Overcast, 20% Light rain, 0% Heavy rain}. Apparently, the models make different forecasts, but also use different terms. Often there may be a one-to-one mapping between these terms, but in general, a more complex relation is necessary. The following matrices show how the meanings of the two different sets of terms overlap (relation R):

|         | Sun | Partly Cloudy | Overcast | Light rain | Heavy rain |
|---------|-----|---------------|----------|------------|------------|
| sunny   | 0.8 | 0.2           | 0        | 0          | 0          |
| clouded | 0   | 0.3           | 0.6      | 0.1        | 0          |
| rainy   | 0   | 0             | 0.1      | 0.5        | 0.4        |

For example, when the term "clouded" is used by the first model, it corresponds to "Partly cloudy" with 30%, to "Overcast" with 60% and to "Light rain" with 10% likelihood. The prediction of model M1 can now be transformed to the foreign terms by matrix multiplication as $M_1'(\vec{x}_1)=\{48\%$ sun, 21% partly cloudy, 19% overcast, 8% light rain, 4% heavy rain}. The distance can now be calculated in the usual way using $M_1'(\vec{x}_1)$ and $M_2(\vec{x}_1)$ which have identical sets in their probability distributions.

If numeric predictions are involved, the relation R may use intervals rather than individual numbers.

The matrix (3) in conjunction with the relation R may be named universal model. For a skilled person, it is clear that the universal model should not be intermixed with other known data mining models. Basically, the universal model represents the data set, i.e., the data point vectors, and predictions of the different data mining models to be compared. The relation R may be needed to match elements of the probability distributions.

In a next step, a matrix (4) of the dimension n by k+3 may be built, wherein the column k+3 holds distances $d_{M_1,M_2}(\vec{x}_i)$ between the two values at the positions k+1 and k+2 of the matrix (4):

$$\begin{pmatrix} \vec{x}_1 & M_1(\vec{x}_1) & M_2(\vec{x}_1) & d_{M_1,M_2}(\vec{x}_1) \\ \vec{x}_2 & M_1(\vec{x}_2) & M_2(\vec{x}_2) & d_{M_1,M_2}(\vec{x}_2) \\ \ldots & & & \\ \vec{x}_n & M_1(\vec{x}_n) & M_2(\vec{x}_n) & d_{M_1,M_2}(\vec{x}_N) \end{pmatrix} \quad (4)$$

As already discussed above, this distance measure $d_{M_1,M_2}$ may be a simple distribution comparison, but in a more complex case it may involve the usage of the relation R to map between the probability distributions.

It is also clear that the universal model may use a different number of matrices. As one example, a first matrix may contain the input data set X, a second matrix the predictions from M1, a third matrix the predictions from M2, a fourth matrix the relation R, and a fifth matrix the distances d.

Finally, a subset S of the domain of interest may be defined. This may be seen as a selection of different rows of the matrix (4). It may be helpful to use a sorting process of the rows of the matrix (4) according to the value of the last column. Those data point vectors in a predefined range, e.g., the rows with the largest 20% of all "column-(k+3)-values", may define a set of data points with similar difference characteristics, e.g., the highest distance measure between the two compared data mining models. Visualization techniques frequently fail to describe such sets of individual data points adequately due to the large number of dimensions.

Therefore, instead of simply sorting the matrix, it may be preferable to apply a predictive data mining algorithm identifying patterns in the (expected) distance values to create a "distance model." Such a model usually may contain the description of regions that are connected in the space of the input dimensions. Regions of interest may then be the regions with the largest average distance between the models. However, also other distance measure criteria may be used, e.g., the region or regions with the lowest distance measure or any other predefined value range of a distance measure.

Using visualization techniques related to the learning algorithms that may be applied, the region or regions determined in such a way may be visualized. A visualization with two or three independent variables may be straightforward. A visualization involving more than three dimensions may require additional mappings.

In the context of this application the following expression conventions have been followed:

Data mining—The term data mining may denote an analytic process designed to explore large amounts of data in search for consistent patterns and/or systematic relationships between variables, and then to validate the findings by applying the detected patterns to new subsets of data. Thus, data mining may generally be denoted as a process of extracting patterns from data. Data mining is becoming an increasingly important tool to transform data into information. It is commonly used in a wide range of profiling practices, such as production quality control and optimization, fraud detection, surveillance, but also in marketing and scientific discovery.

Data mining can be used to uncover patterns in data, but is often carried out only on samples of data. The mining process may be ineffective if the samples are not a good representation of a larger body of data. Data mining may not discover patterns that may be present in the larger body of data if these patterns are not present in the sample being "mined". Inability to find patterns may become a cause for some disputes between different production facilities. Therefore, data mining is not foolproof, but may be useful if sufficiently representative data samples are collected. The discovery of a particular pattern in a particular set of data does not necessarily mean that a pattern is found elsewhere in the larger data from which that sample was drawn. An important part of the process is the verification and validation of patterns on other samples of data.

Data mining model—A data mining model may denote an abstract or mathematical model of a group of somehow interrelated data points. The model may allow a prediction of data points to be part of a data region based on a certain probability. Different data mining models may be used, e.g., regression models, clustering models, categorization models, rule determination models, etc. A skilled person knows when to use which model. Sometimes different models may be applied to the same data set. This may be the case in situations, in which it is not obvious which data mining model may be the most appropriate one. Especially in those cases, it may be advantageous having a method and an engine to compare the behavior of different data mining models in different regions of a dataset.

Region—A region may denote a connected mathematical space with a defined boundary of data point vectors of a given dataset. This way, the complete dataset defines a mathematical data point space. The boundary may be seen as a hyper-surface.

Universal model—A universal model may denote a matrix like the matrix (3) comprising all data point vectors and results of the data mining models applied to individual data point vectors. It further comprises a relation between the members of the predicted probability distributions.

Distance measure—A distance measure may denote a difference between results of different data mining models for the same data point vector as input value. In the simplest way, a distance measure may be the sum of absolute differences between the pairs of probability values. Alternative difference measures include the Kullback-Leibler divergence. A distance measure may also include extending the distributions returned from both models so that they are defined on the same values, using a relation between predictions (maybe a joint distribution).

In the numeric case, the probability distribution may have different forms, like a Gaussian distribution curve, a Poisson distribution curve, or others. For easier comparison and for building a distance measure, the probability distribution curves may be approximated in an area around the expectation values generated by the different data mining models, and a mean value of such approximations may then be compared and may build the distance measure. A distance function built that way may be described as a probabilistic distance measure.

The above-described method for running a data mining comparison engine and the associated data mining comparison engine may offer some advantages.

The inventive method may allow a comparison of data mining models that are independent of the structure of the original data mining models to be compared. It may also ensure that the comparison method remains statistically relevant and may not be biased by the initial structure of the data mining models. And it may enable flexible learning and visualization of results of the comparison process.

Thus, a general approach for comparing data mining models regardless of their types is provided. Besides comparing two data mining models built by two different experts, the inventive method may allow for several other applications. One may be tracking of data mining models over time. Data mining models may be built at regular intervals, for instance, each month. Then it may be possible to compare how the data mining models built on updated data sets relate to the data mining model derived from a previous month.

Another common application may be building data mining models for different subsets of a whole dataset, e.g., in a production type environment only production data from a specific day of the week. This may then reveal how and why the production quality may differ during the course of the week, e.g., that on Mondays, the production quality is low for one product while for other products another day in a week yields lower production quality.

Data mining techniques are used in many areas of scientific research and in different areas of the industry. Some examples are:

(a) Weather forecast models as already briefly mentioned.
(b) Production quality comparison for similar products from different production sites or at different times.
(c) Spare part reliability comparison: Input values for related data mining models may comprise age of a part, production site, used in product, probability to fail during the next defined time period.
(d) Oil and natural gas exploration: The probability for finding natural resources depends on many input variables. Different data mining models may deliver different results. A comparison may uncover higher changes for better exploration results.
(e) Credit industry: Data mining models may be used to predict credit risks based on different characteristics of the credit user such as age, income, family status, earlier credits, annual income, etc.
(f) Buying behavior analysis and prediction: Data mining models may be used to predict buying behavior of customers based on historic buying patterns and other personal criteria.
(g) Seismic methods in volcano research for eruption prediction: This application of the data mining model comparison may enhance security of people living near a volcano.

For all those data mining application areas and others, a comparison methodology between different data mining models may be very helpful in order to generate better predictions.

Different embodiments of the method for running a data mining model comparison engine may be advantageous in application areas different from the above mentioned.

In one embodiment of the method, the probabilistic distance measure is a measure for comparing univariate probabilistic distributions. This means that only one variable is observed as dependent variable for the probabilistic distributions. This may make the calculation of a distance measure more feasible and easier to interpret. In multivariate probabilistic distributions, an interpretation of differences between different data mining models is more complex and also visualization becomes more complex. In another embodiment of the method, the univariate probabilistic distance measure may be an L1 metric.

In yet another embodiment of the method, the user may be interested in a predefined value range of the distance measure. The predefined value range may either be the lowest value of the distance measure of all regions or the highest value of the distance measure of all regions. However, other predefined distance measure ranges may be specifiable. Typically, a skilled person may choose the sub-region or the sub-regions with the highest difference, i.e., the biggest distance measure, between the data mining models to be compared or visualized.

As discussed above, the data mining models M1, M2 may belong, each individually to one data mining task out of the group comprising classification, regression and clustering. Here an advantage of the inventive method may become clear again, as different types of data mining models may be compared. A skilled person understands that classification, regression and clustering are completely different data mining approaches that may not be compared directly.

In another embodiment of the method, the method may also comprise a statistical test ensuring a statistical significant distance measure. The statistical significance of a result is the probability that the calculated distance measure has occurred by pure chance, and that in the population from which the sample was drawn, no such differences exist. Using less technical terms, we may say that the statistical significance of a result may tell something about the degree to which the result is "true" (in the sense of being "representative of the population"). More technically, the p-value represents a decreasing index of the reliability of a result. The higher the p-value, the less one may believe that the observed distance measure in a region may be a reliable indicator of the distance measure. Specifically, the p-value represents the probability of an error that may be involved in accepting calculated values of the distance measure as valid, that is, as "representative of the population." For example, a p-value of 0.05 may indicate that there is a 5% probability that the distance measure found in a sub-region is a "fluke". In many areas of research and industrial application, the p-value of 0.05 is customarily treated as a "border-line acceptable" error level.

Furthermore, a computer or computer system may comprise a data mining comparison engine as described above and referring to the method for running a data mining comparison engine for comparing measured data point vectors.

It should be noted that embodiments may take the form of an entire hardware implementation, an entire software embodiment or an embodiment containing both, hardware and software elements. In an embodiment, the invention is implemented in software which includes, but is not limited to, firmware, resident software and microcode.

In one embodiment, a data processing program for execution in a data processing system is provided comprising software code portions for performing the method as described above when the program is run on a data processing system. The data processing system may be a computer or computer system.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating, or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a random access memory (RAM), a read-only memory (ROM), a rigid magnetic disk and an optical disk. Current examples of optical disks include compact disk-read only memory (CD-ROM), compact disk-read/write (CD-R/W), DVD and Blue-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular between features of the method type claims, and features of the apparatus type claims, is considered as to be disclosed within this document.

The aspects defined above and further aspects of the present invention are apparent from the examples of embodiment to be described hereinafter and are explained with reference to the examples of embodiment, but to which the invention is not limited.

Detailed Description of Examplary Embodiments

In the following, a detailed description of the figure will be given. All illustrations in the figures are schematic. Firstly, a block diagram of the inventive method for running a data mining comparison engine will be described. Afterwards, embodiments of a method and a data mining comparison engine will be described.

FIG. 1 shows a block diagram of the inventive method 100 for running a data mining comparison engine for comparing measured data point vectors. The method may comprise providing optionally a first data dataset D1 and a second data set D2, 102, comprising the measured data point vectors. A first data mining model M1 and a second data mining model M2, 102 are results of carrying out the data mining tasks T1, T2 on D1, D2. In some embodiments, it is sufficient that just M1, M2 are provided in 102. Block 104 may illustrate determining the relation R between the prediction values of M1 and M2. Block 106 may illustrate determining the input data set X. In block 108, the data mining models M1, M2 are applied to records of the input data set X. A calculation of a distance measure using a distance function d(x, M1, M2) may be illustrated by block 110. Finally, block 112 may represent determination and displaying of at least one region of interest having a value of the distance measure fulfilling a predefined condition.

Using this method may solve the following tasks: A company may produce a product P, which may be produced in several production sites. Part of the production may be defective, and the company may create data mining models in each production site and at several points in time to predict whether a finished product may be defective. In order to make a prediction, a number of measurements may be made resulting in data point vectors, such as room temperature, humidity, time of day, day of week, velocity of production belt, energy consumed by heating unit, etc.

Using a predictive model, potential reasons for failure may be detected, and in the case of more complex reasons, it may be possible to react before a failure occurs, when one or more of potentially critical situations arise.

In order to detect differences between production sites, the company may want to compare the respective data mining models and may determine situations that are likely to lead to failure in one site, but have no negative effect in another. Similarly, changes over time may be detected, e.g., one data mining model may have been created before a certain machine has been replaced and another data mining model afterwards.

Figure 2:
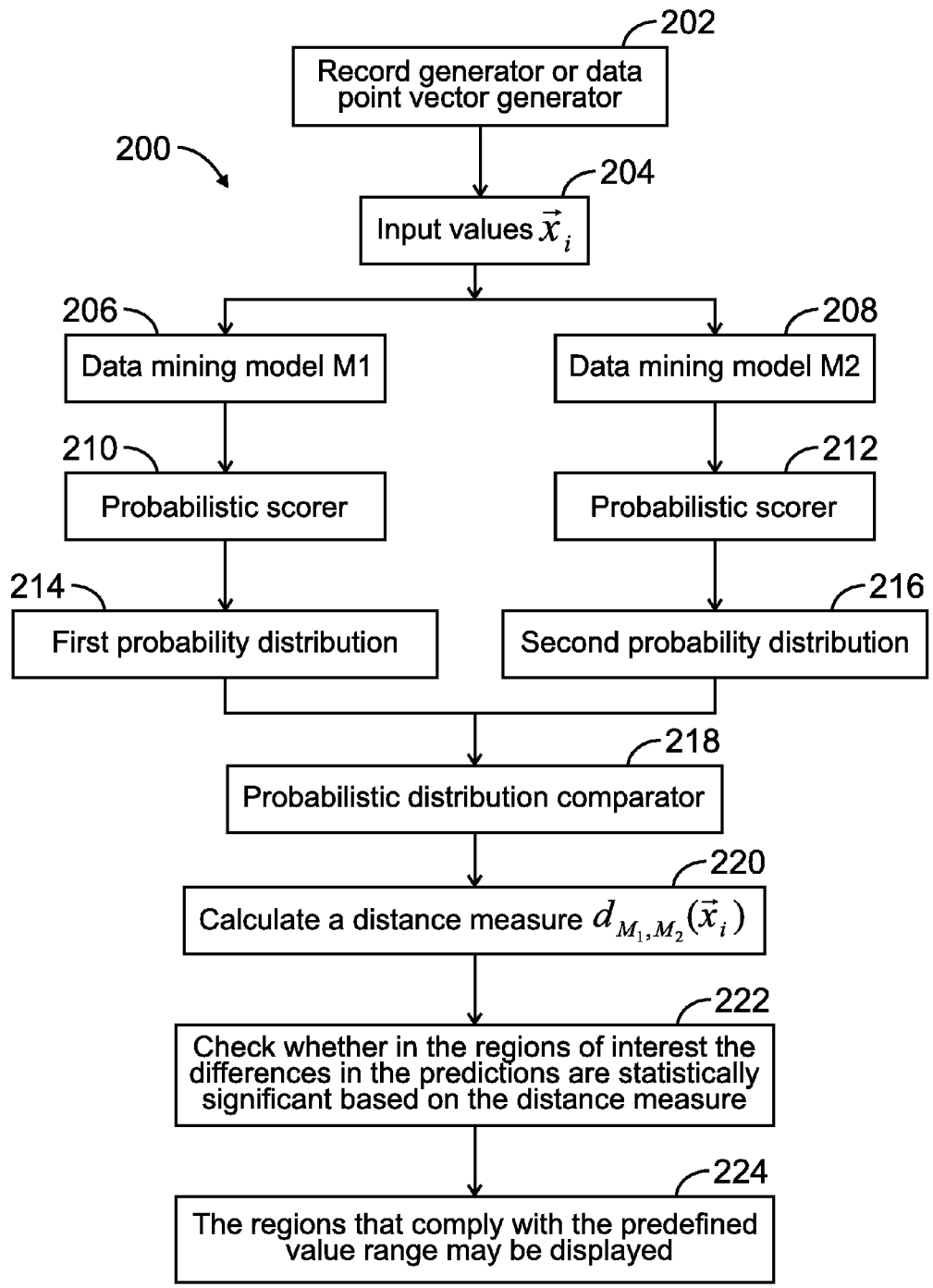
FIG. 2 shows a more detailed block diagram of steps of the inventive method.

FIG. 2 may illustrate a more detailed block diagram 200 of steps of the inventive method. As input values $\vec{x}_i$ 204 for the data mining models M1 206 and M2 208, two options may be available. Either the input values may be measured data point vectors, or, new data point vectors may be generated using the existing data mining models M1 206 or M2 208, or both. A record generator or data point vector generator 202 may illustrate that.

In a next step, the input values or data point vectors are used by a probabilistic scorer 210 for M1. Additionally, also M2 performs a probabilistic scoring by probabilistic scorer 212. The first probability distribution 214 and the second probability distribution 216 are the results of the probabilistic scoring. Next, a probabilistic distribution comparator 218 calculates a distance measure $d_{M_1,M_2}(\vec{x}_i)$ 220.

In another step 222, it may be checked whether in the regions of interest the differences in the predictions are statistically significant based on the distance measure. The distances may also be compared to and filtered by a predefined value range. Finally, the regions that comply with the predefined value range may be displayed, 224, to a user for further action and decision.

Figure 3:
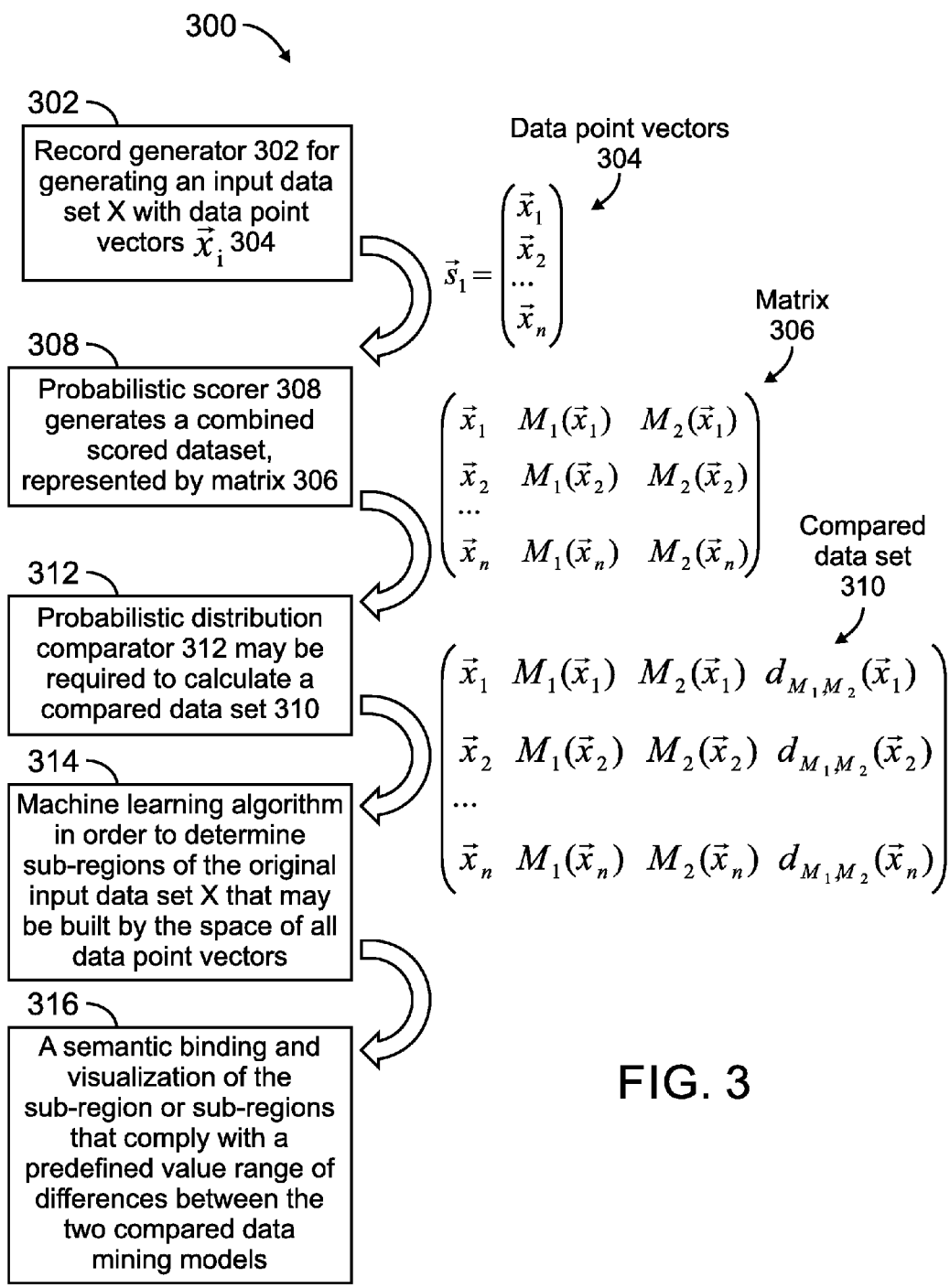
FIG. 3 shows a different perspective of details of the method for running a data mining comparison engine.

FIG. 3 shows a different perspective 300 of details of the method for running a data mining comparison engine. Block 302 may illustrate a step of a record generator for generating an input data set X with data point vectors $\vec{x}_i$ 304, wherein "i" may run from 1 to n. Each data point vector 304 may have k dimension, meaning that k individual values or data elements may be relevant for each vector. Starting from the dataset X and the provided data mining models M1, M2, a probabilistic scorer 308 may generate a combined scored dataset, represented by matrix 306. This may be named a universal model. This matrix may comprise k+2 columns, i.e., the original data point vectors as well as results of an application of data mining models M1 and M2 to the data point vectors. These applications are positioned in matrix 306 in column k+1 and k+2, respectively. Note that in general, the universal model also comprises a relation R between the predictions of M1 and those of M2.

Next, a probabilistic distribution comparator 312 may be required to calculate a compared data set 310. In the matrix 310, additionally, a distance measure $d_{M_1,M_2}(\vec{x}_i)$ may be included in a column k+3. Block 314 may represent a machine learning algorithm in order to determine sub-regions of the original input data set X that may be built by the space of all data point vectors. Finally, step 316 may represent a semantic binding and visualization of the sub-region or sub-regions that comply with a predefined value range of differences between the two compared data mining models. Typically, a sub-region or sub-regions with the largest differences may be displayed. However, a skilled person may understand that also sub-regions with other characteristics may be selected.

Figure 4:
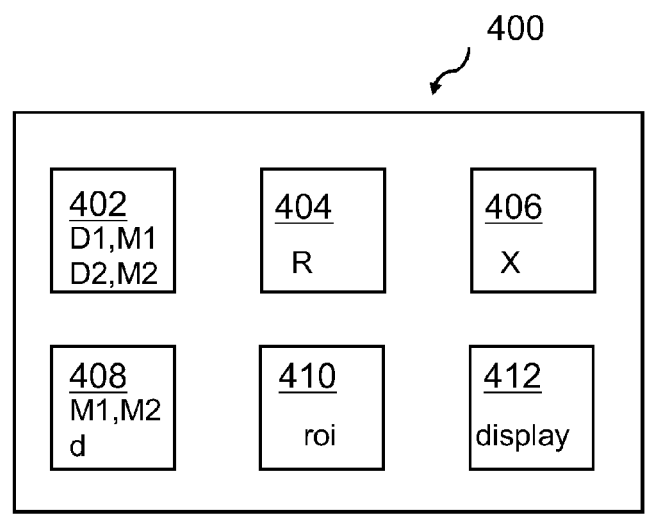
FIG. 4 shows a block diagram of a data mining comparison engine according to an embodiment of the invention.

FIG. 4 shows a block diagram of a data mining comparison engine 400 according to an embodiment of the invention. There may be provided a providing unit 402 adapted for optionally providing first and second datasets D1, D2 of measured data point vectors. The providing unit may also provide a first data mining model M1, and a second data mining model M2. A relation determining unit 404 may determine the relation between the set of first prediction values provided by M1 and the set of second prediction values provided by M2. This functionality may also be part of the unit 402. An input data set unit 406 may determine the input data set X, which is some cases may be one of the data sets D1, D2 as discussed above. Additionally, a calculation unit 408 may be available adapted for calculating a universal model based on the first and the second data mining models and the input dataset. A second calculation unit may be adapted for calculating a distance measure using a distance function d(x, M1, M2) based on the universal model between the first data mining model M1 and the second data mining M2. The first and second calculation units may be provided as a single calculation unit. A region building unit 410 may be adapted for finding regions within the input data set X based on distance measure values. Moreover, a determination and displaying unit 412 may be adapted for determining and displaying of at least one region having a predefined value range of the distance measure.

In the context of FIG. 1 and FIG. 4 it should be noted that a distance function d(x, M1, M2) may be calculated, wherein x may be any measured data point vector. Alternatively, also other data point vectors may be used that may be within or near the domain of interest, e.g., those data point vectors having been generated using the first data mining M1 or the second data mining model M2.

Figure 5:
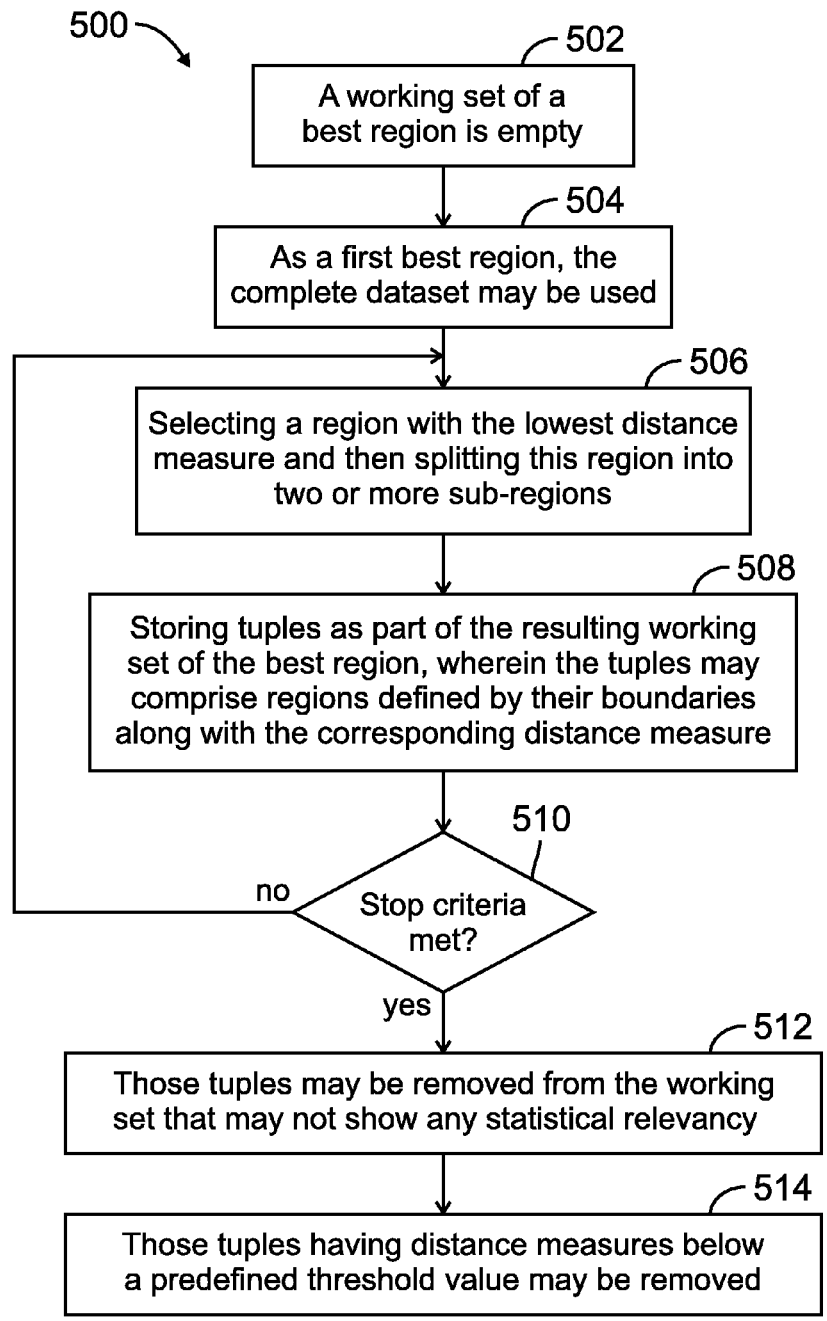
FIG. 5 shows a flow chart of how to determine displayable regions.

FIG. 5 shows a flow chart of how to determine displayable regions. Initially, a working set of a best region is empty, 502. Then, as a first best region, the complete dataset may be used, 504. The next two steps may be repeated until stop criteria may be met, 510: a) Selecting a region with the lowest distance measure and then splitting this region into two or more sub-regions, 506; b) Storing tuples as part of the resulting working set of the best region, wherein the tuples may comprise regions defined by their boundaries along with the corresponding distance measure, 508.

Finally, those tuples may be removed from the working set that may not show any statistical relevancy, 512. Additionally, those tuples having distance measures below a predefined threshold value, may be removed, 514, before displaying.

Figure 6:
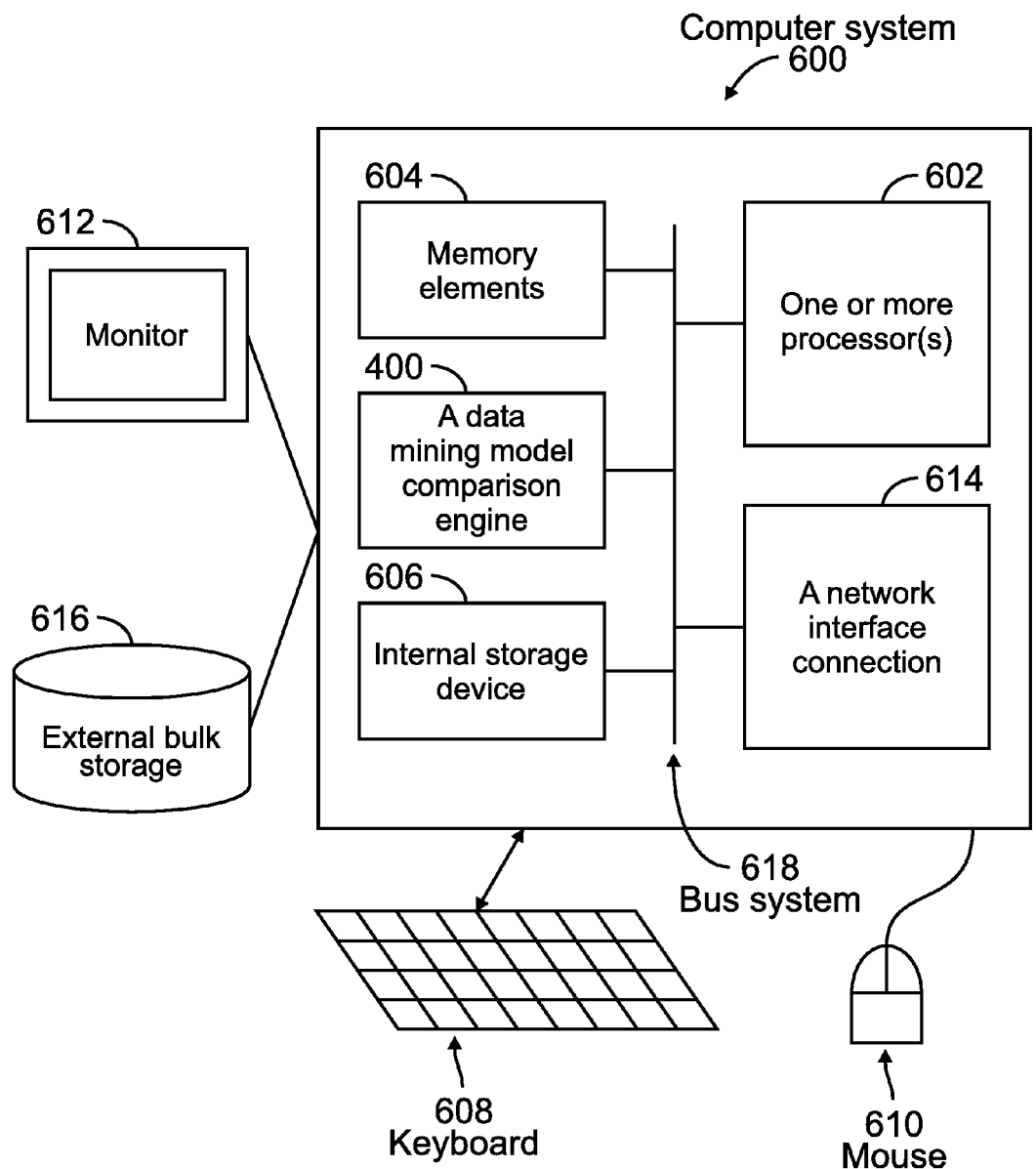
FIG. 6 illustrates a computer system comprising a data mining comparison engine according to an embodiment of the invention

Embodiments of the invention may be implemented on virtually any type of computer, regardless of the platform being used, that is suitable for storing and/or executing program code. For example, as shown in FIG. 6, a computer system 600 may include one or more processor(s) 602 with one or more cores per processor, associated memory elements 604, an internal storage device 606 (e.g., a hard disk, an optical drive such as a compact disk drive or digital video disk (DVD) drive, a flash memory stick, etc.), and numerous other elements and functionalities typical of today's computers (not shown). The memory elements 604 may include a main memory, employed during actual execution of the program code, and a cache memory, which provides temporary storage of at least some program code or data in order to reduce the number of times, code must be retrieved from external bulk storage 616 for an execution. Elements inside the computer 600 may be linked together by means of a bus system 618 with corresponding adapters. Additionally, a data mining model comparison engine 400 may be attached to the bus system 618.

The computer system 600 may also include input means, such as a keyboard 608, a mouse 610, or a microphone (not shown). Furthermore, the computer 600, may include output means, such as a monitor 612 [e.g., a liquid crystal display (LCD), a plasma display, a light emitting diode display (LED), or cathode ray tube (CRT) monitor]. The computer system 600 may be connected to a network (e.g., a local area network (LAN), a wide area network (WAN), such as the Internet, or any other similar type of network, including wireless networks via a network interface connection 614. This may allow a coupling to other computer systems. Those, skilled in the art will appreciate that many different types of computer systems exist, and the aforementioned input and output means may take other forms. Generally speaking, the computer system 600 may include at least the minimal processing, input and/or output means, necessary to practice embodiments of the invention.

Further, those, skilled in the art will appreciate that one or more elements of the aforementioned computer system 600 may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources or a smartphone.

Further, software instructions to perform embodiments of the invention may be stored on a computer readable medium, such as a compact disk (CD), a diskette, a tape, or any other computer readable storage device.

While the invention has been described with respect to a limited number of embodiments, those, skilled in the art, having benefit of this disclosure, will appreciate that other embodiments can be devised, which do not depart from the scope of the invention as disclosed herein. Accordingly, the scope of the invention should be limited only by the attached claims.

It should also be noted that the term "comprising" does not exclude other elements or steps and "a" or "an" does not exclude a plurality. Also, elements described in association with different embodiments may be combined. It should also be noted that reference signs in the claims should not be construed as limiting elements.

The invention claimed is:

1. A method for comparing a first data mining model and a second data mining model, comprising:
providing a first data mining model M1 representing results of a first data mining task on a first data set D1, wherein the first data mining model provides a set of first prediction values;
providing a second data mining model M2 representing results of a second data mining task on a second data set D2, wherein the second data mining model provides a set of second prediction values;
providing a relation R between the set of first prediction values and the set of second prediction values to map between the first prediction values and the second prediction values;
determining an input data set X;
for each record of the input data set:
creating a first probability distribution based on the first data mining model, wherein the first probability distribution associates probabilities with the set of first prediction values;
creating a second probability distribution based on the second data mining model, wherein the second probability distribution associates probabilities with the set of second prediction values; and
calculating a distance measured using the first probability distribution, the second probability distribution, and the relation R; and
determining at least one region of interest based on the distance measured calculated for each record of the input data set, wherein the at least one region of interest consists of records of the input data set having the distance measure fulfilling a predefined criterion.

2. The method of claim 1, wherein the first data mining model and the second data mining model are structurally different.

3. The method of claim 1, wherein the first data mining task is different from the second data mining task.

4. The method of claim 1, wherein the first data mining task and the second data mining task are each individually one of the following: classification, regression, and clustering.

5. The method of claim 1, wherein the distance measure is calculated using a probabilistic distance measure.

6. The method of claim 5, wherein the distance measure is an L1 metric.

7. The method of claim 1, further comprising:
visualising the at least one region of interest to a user.

8. The method of claim 1, further comprising:
performing a statistical test to ensure a statistically significant difference based on the distance measure.

9. A data mining comparison engine for comparing a first data mining model and a second data mining model, comprising:
a processor; and
storage storing program code, wherein the program code, when executed by the processor, performs:
providing a first data mining model M1 representing results of a first data mining task on a first data set D1, wherein the first data mining model provides a set of first prediction values;
providing a second data mining model M2 representing results of a second data mining task on a second data set D2, wherein the second data mining model provides a set of second prediction values;
providing a relation R between the set of first prediction values and the set of second prediction values to map between the first prediction values and the second prediction values;
determining an input data set X;
for each record of the input data set:
creating a first probability distribution based on the first data mining model, wherein the first probability distribution associates probabilities with the set of first prediction values;
creating a second probability distribution based on the second data mining model, wherein the second probability distribution associates probabilities with the set of second prediction values; and
calculating a distance measured using the first probability distribution, the second probability distribution, and the relation R; and
determining at least one region of interest based on the distance measured calculated for each record of the input data set, wherein the at least one region of interest consists of records of the input data set having the distance measure fulfilling a predefined criterion.

10. The data mining comparison engine of claim 9, wherein the program code, when executed by the processor, performs:
displaying the at least one region of interest based on a predefined value range of the distance measure.

11. The data mining comparison engine of claim 9, wherein the first data mining model and the second data mining model are structurally different.

12. The data mining comparison engine of claim 9, wherein the first data mining task is different from the second data mining task.

13. The data mining comparison engine of claim 9, wherein the distance measure is calculated using a probabilistic distance measure.

14. A computer program product for comparing a first data mining model and a second data mining model, comprising:
a non-transitory computer-readable medium storing program code;
the program code, when executed by a computer, performs:
providing a first data mining model M1 representing results of a first data mining task on a first data set D1, wherein the first data mining model provides a set of first prediction values;
providing a second data mining model M2 representing results of a second data mining task on a second data set D2, wherein the second data mining model provides a set of second prediction values;
providing a relation R between the set of first prediction values and the set of second prediction values to map between the first prediction values and the second prediction values;
determining an input data set X;
for each record of the input data set:
creating a first probability distribution based on the first data mining model, wherein the first probability distribution associates probabilities with the set of first prediction values;
creating a second probability distribution based on the second data mining model, wherein the second probability distribution associates probabilities with the set of second prediction values; and
calculating a distance measured using the first probability distribution, the second probability distribution, and the relation R; and
determining at least one region of interest based on the distance measured calculated for each record of the input data set, wherein the at least one region of interest consists of records of the input data set having the distance measure fulfilling a predefined criterion.

15. The computer program product of claim 14, wherein the first data mining model and the second data mining model are structurally different.

16. The computer program product of claim 14, wherein the first data mining task is different from the second data mining task.

17. The computer program product of claim 14, wherein the distance measure is calculated using a probabilistic distance measure.

* * * * *